United States Patent [19]
Kosak et al.

[11] Patent Number: 5,964,888
[45] Date of Patent: Oct. 12, 1999

[54] CIRCUIT ARRANGEMENT FOR EXECUTING A RESET

[75] Inventors: Wolfgang Kosak; Reinhard Pfeufer, both of Moeglingen; Guenter Braun, Bietigheim; Klaus Mueller, Asperg, all of Germany

[73] Assignee: Robert Bosch GmbH, Stuttgart, Germany

[21] Appl. No.: 08/743,777

[22] Filed: Nov. 7, 1996

[30] Foreign Application Priority Data

Nov. 9, 1995 [DE] Germany ............................ 195 41 734

[51] Int. Cl.⁶ ...................................................... G06F 11/00
[52] U.S. Cl. ............................... 714/23; 714/11; 714/815; 701/114
[58] Field of Search .......................... 395/182.21, 182.01, 395/182.11, 182.09; 701/114; 371/62; 714/23, 3, 11, 815

[56] References Cited

U.S. PATENT DOCUMENTS

| | | | |
|---|---|---|---|
| 4,580,220 | 4/1986 | Braun et al. ........................ | 364/431.11 |
| 4,868,817 | 9/1989 | Shigihara . | |
| 4,881,227 | 11/1989 | Buhren ......................................... | 371/9 |
| 5,203,000 | 4/1993 | Folkes ...................................... | 395/750 |
| 5,333,285 | 7/1994 | Drerup ..................................... | 395/575 |
| 5,600,785 | 2/1997 | Potter ................................. | 395/182.21 |
| 5,654,888 | 8/1997 | Muller et al. ..................... | 364/424.083 |

FOREIGN PATENT DOCUMENTS

| | | |
|---|---|---|
| 32 43 760 C3 | 4/1989 | Germany . |
| 34 10 257 C2 | 2/1993 | Germany . |
| 2 241 361 | 8/1991 | United Kingdom . |

OTHER PUBLICATIONS

W. Kuntz et al., "Intelligence, Wortorientierte Watchdog–Schaltung", Elektronik 11/25.5 1990.

*Primary Examiner*—Robert W. Beausoliel, Jr.
*Assistant Examiner*—Brian H. Shaw
*Attorney, Agent, or Firm*—Kenyon & Kenyon

[57] ABSTRACT

A circuit arrangement for executing a reset, in which controlled resetting of a functional computer and a safety module takes place. A reset stage is able to coerce both the functional computer and the safety module into a reset state, while all output stages are switched off for all reset states. The functional computer and the safety module are connected by a serial interface to continually monitor each other and can mutually reset one another in the case of a fault.

20 Claims, 8 Drawing Sheets

CIRCUIT ARRANGEMENT FOR EXECUTING A RESET

FIELD OF THE INVENTION

The present invention relates to a circuit arrangement for executing a reset of a computing unit, in particular for an electronic control unit of a motor vehicle.

BACKGROUND INFORMATION

Generic circuit arrangements are known. For example, computing units are used in electronic control units in motor vehicles to assume diverse control and/or monitoring functions for electronic and/or electrical equipment units of the motor vehicle. The electronic control unit has output stages which drive the equipment units. Because of the increased equipping of safety-relevant modules of the motor vehicle with electronic components driven via the electronic control unit, the importance of a coordinated reaction, particularly in case of a malfunction, is particularly great. In particular, in the case of a necessary resetting of the computing unit, a controlled re-enabling of the computing unit must take place.

SUMMARY OF THE INVENTION

The circuit arrangement according to the present invention offers the advantage of a reliable reset stage for a safety-relevant computing unit that drives components. Due to the fact that the computing unit has a functional computer and a safety module (e.g., a safety computer) connected to the functional computer via a serial interface, both of which are connected to the reset stage and can be switched by the reset stage coercively into the reset state, it is advantageously possible to achieve extremely effective and active error suppression for safety-relevant systems through permanent, intelligent, mutual monitoring of the functional computer and the safety computer as well as software monitoring of the functional computer with simple circuit expenditure.

BRIEF DESCRIPTION OF THE DRAWINGS

Exemplary embodiments of the present invention are explained in more detail hereafter and are depicted in the drawings.

DETAILED DESCRIPTION OF THE INVENTION

Figure 1:
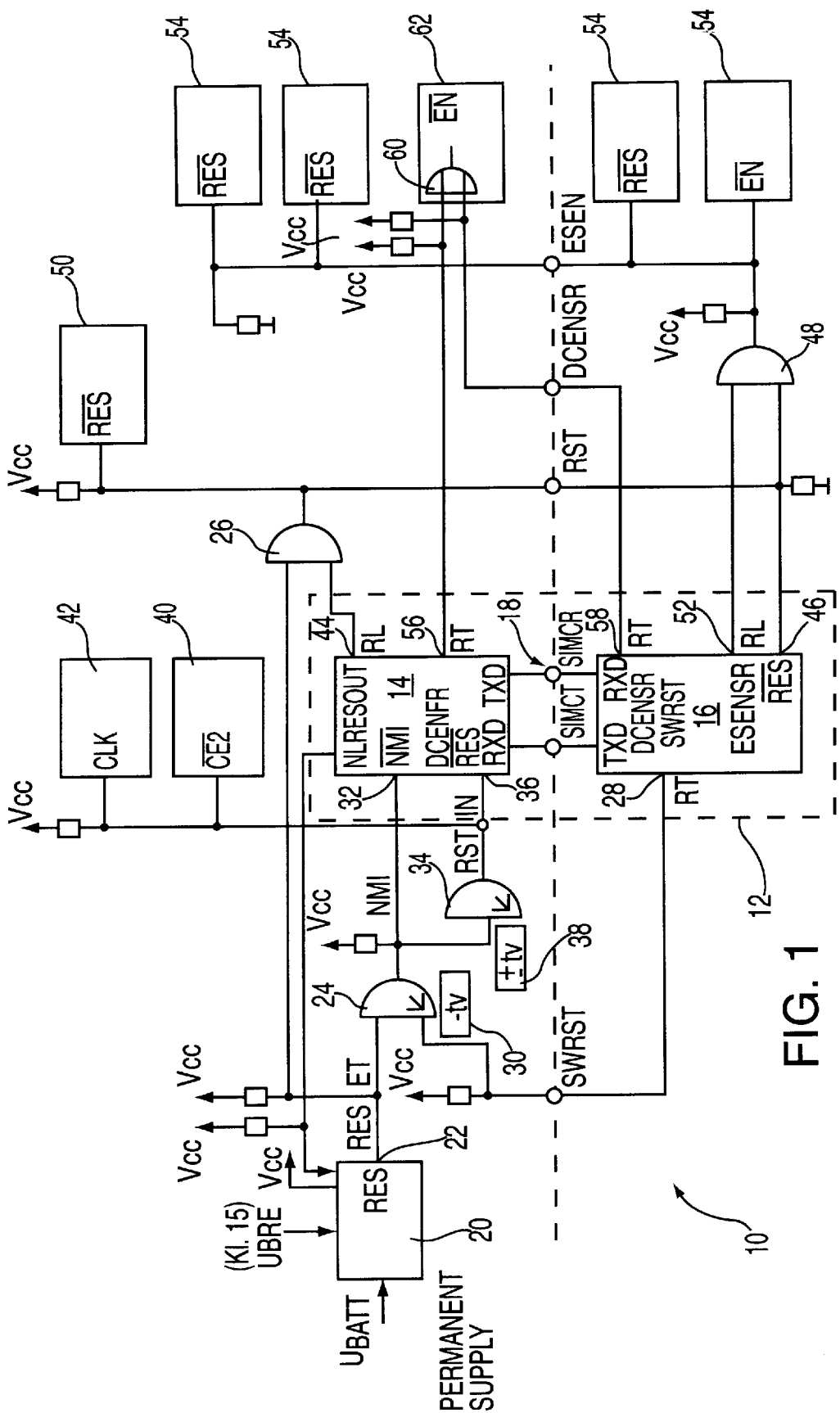
FIG. 1 depicts an overall view of a first embodiment of the circuit arrangement according to the present invention.

FIG. 1 shows a circuit arrangement 10 for executing a reset of a computing unit 12. The computing unit 12 comprises a functional computer 14 and a safety computer 16 whose respective transmitter outputs and receiver inputs are connected together via a serial interface 18. The serial interface 18 can be a synchronous serial 2-wire interface or an asynchronous serial 1-wire interface. Moreover, the circuit arrangement 10 has a reset module 20 that can be a stabilizing reset module, for example. The stabilizing reset module is tied to the battery voltage (permanent supply) and can be activated via the signal UBRE. It supplies the circuit with the operating voltage $V_u$ and generates, in case of under-voltage, a reset 22. In the follow-up procedure, (UBRE $\leq 3$ v), the module can be further activated via the signal NL. The reset output 22 is connected to the first input of a first AND element 24 and to the first input of a second AND element 26. The second input of the first AND element 24 is connected to a software reset output 28 (SWRST) of the safety computer 16. The AND element 24 has a timing element 30 associated with the second input having an asymmetrical mode of operation. The output of the AND element 24 is connected to the NMI input 32 of the functional computer 14. Moreover, the output of the AND element 24 is connected via a non-inverting switching stage 34 to the reset input 36 of the functional computer 14. A timing element 38 is associated with the switching stage 34. The output of the switching stage 34 is also connected to a RAM module 40 and an EEPROM module 42.

The reset output 44 (RESOUT) of the functional computer 14 is connected to the second input of the AND element 26. The output of the AND element 26 is connected to the reset input 46 of the safety computer 16 and to a first input of an AND element 48. Moreover, the output of the AND element 26 is connected to a CAN module 50. The second input of the AND element 48 is connected to the output stage switch-off output 52 (ESENSR) of the safety computer 16. The output of the AND element 48 is connected to output stages 54. The output 56 of the functional computer 14 on which the DC enable signal of the functional computer 14 is present as well as the output 58 of the safety computer 16 on which the DC enable signal of the safety computer 16 is present are connected to a logical input module 60 of an EGAS module 62. The further connections of the circuit arrangement 10 shall not be considered further in the context of the present description.

The circuit arrangement 10 shown in FIG. 1 exercises the following function:

In case of a reset, either the signal from the reset module 20 or the software reset signal 28 is present on the AND element 24 and causes an NMI signal at the NMI input 32 of the functional computer. If it is the software reset signal SWRST which is present, it is fed via the asymmetrically acting timing element 30. This is because the functional computer 14 needs a minimum reset time dependent on the internal crystal (quartz) frequency for internal processing of a complete reset routine. The timing element 30 delays the clearing of the software reset SWRST of the safety computer 16 to the functional computer 14. This prevents, in the case of a software reset triggered by the safety computer, the signal from being delayed only on the switching stage 34 (to be explained below) and immediately reset via the linkage of the reset output signal RESOUT present at the output 44 and the reset signal RESET via the AND element 26 of the safety computer 16, wherein the software reset signal SWRST would be canceled and the functional computer 14 would be immediately fetched back out of the reset via the switching stage 34 and the minimum reset time would not be able to elapse.

The NMI signal present at the output of the AND element 24 is fed directly to the NMI input 32 of the functional computer 14 and, via the non-inverting switching stage 34, as a reset input signal RSTIN to the reset input 36 of the functional computer 14. Thus, it becomes possible to use functional computers 14 that stop immediately for a reset input signal RSTIN and all ports go into the tri-state mode and even started read or write routines are interrupted, even though use of such functional computers 14 would lead to faulty writing of RAM cells of the functional computer 14. Through the timing element 38 associated with the switching stage 34, the reset input signal RSTIN is delayed to the extent that the NMI signal present at the input 32 compels the functional computer 14 to completely process the already invoked command in a special reset routine. After the functional computer 14 is switched into this reset routine, the functional computer 14 is reset via the reset input 36. The reset input signal RSTIN present at the output of the switching stage 34 is used simultaneously to block possibly provided RAM modules 40 or rather EEPROM modules 42.

The safety computer 16 is reset by the AND element 26 if either the reset signal 22 from the reset module 20 or the RESOUT signal 44 from the functional computer 14 are active (low). This signal is present at the reset input 46 of the safety computer 16. Simultaneously, the reset signal for the safety computer 16 can be used to switch off the output stages 54. For this purpose, it is linked via the AND element 48 with the output stage switch-off signal ESENSR of the safety computer 16 and fed to the reset inputs of the output stages 54. Moreover, the reset signal for the safety computer 16 can be used to reset possibly present CAN modules 50.

Overall, with the circuit arrangement 10 shown in FIG. 1, a reset concept is created in which, by means of a reliable reset stage in case of a malfunction, output stage switch-off is possible, particularly when driving safety-relevant systems via the output stages 54. By dividing the computing unit 12 into the functional computer 14 and the safety computer 16 that communicate with one another via the serial interface 18, the computers can act separately from one an other (each computer has its own clock generator), and they are nonetheless driven via a reset stage 20. The circuit arrangement 10 is designed such that for each reset signal RESET made available via the reset stage 20, the functional computer 14 as well as the safety computer 16 are coercively brought into the reset state. During the entire reset phase of the computing unit 12, all output stages 54 are inactive, i.e., without current.

Through the coupling of the functional computer 14 with the safety computer 16, the reset phase of the safety computer 16 is not completed until after the initialization of the functional computer 14. The output stages 54 are not re-enabled until after the safety computer 16 has also completed the reset phase for its part. For this purpose, the safety computer 16 starts communication after its initialization with the functional computer 14 via the serial interface 18 and does not enable the output stages 54 until after communication has taken place. The functional computer 14 and the safety computer 16 thus monitor one another mutually via the serial interface 18 for plausibility and functionality and can mutually trigger a software reset in case of a fault. This allows quasi internal program monitoring that triggers the software reset in case of a program execution disruption. The functional computer 14 can additionally activate an internal watchdog that likewise triggers a reset if a program execution disruption is detected.

By way of the DCENFR and DCENSR signals present at the output 56 of the functional computer 14 or output 58 of the safety computer 16, it is possible in order to further increase the reliability (safety) to separately switch off, but only mutually switch on, the EGAS output stage 62 both from the functional computer 14 as well as from the safety computer 16.

Figure 2:
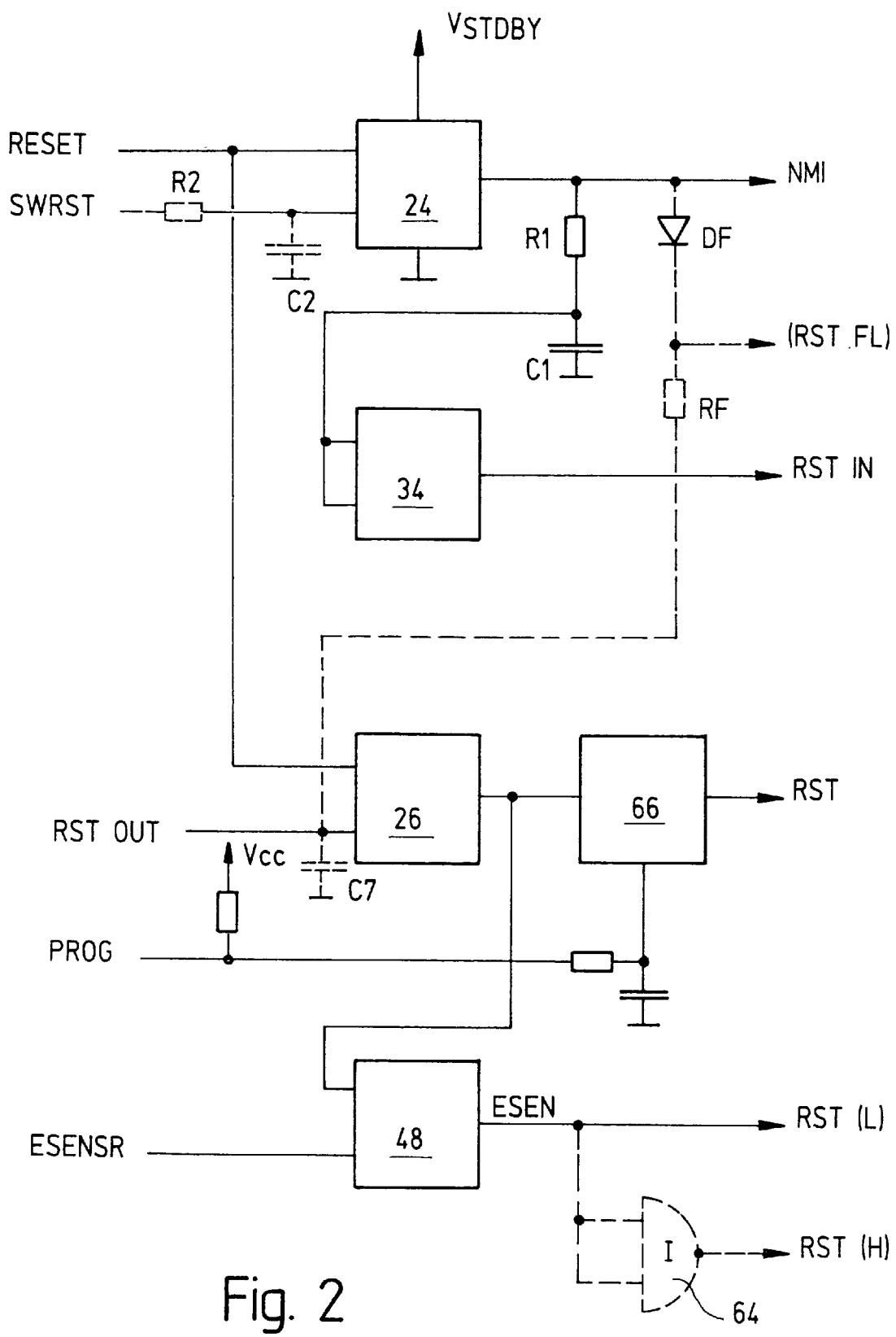
FIG. 2 depicts a circuit diagram of a part of the circuit arrangement shown in FIG. 1.

In FIG. 2, the components of the reset concept are shown again, but parts identical to those used in FIG. 1 are given the same reference signs and are not explained anew. It is clear that the entire circuit arrangement for executing the reset includes the four AND elements 24, 34, 26 and 48. In order to illustrate the linking of the AND elements amongst one another, the signal inputs and signal outputs are designated with the signals already designated in FIG. 1.

In the circuit arrangement shown in FIG. 1, an ESEN signal for output stages 54 with an active low reset is present at the output of the AND element 48. If output stages with an active high reset are to be switched off, the ESEN signal present at the output of the AND element 48 is fed via an additional inverting switching stage 64 (FIG. 2) and a reset high signal RST (H) thus formed alongside the reset low signal RST (L).

Moreover, an additional circuit component can be provided for forming a reset flash signal RST FL (FIG. 2). This reset flash signal is necessary since in computing units 12 having flash memories, the flash memory is reset later than the computer and the clearing of the reset state should take place earlier than in the computer. In this manner, irregular states are avoided in the bus system of the computer. The reset flash signal is formed from the NMI signal via a diode DF and from the reset output signal RSTOUT of the functional computer 14. The NMI signal is quickly cleared via the diode DF, whereas the reset output signal RSTOUT is delayed via a resistor RF and a capacitor C7.

In FIG. 2, moreover, a programming signal PROG is shown that is externally applied and prevents, via an analog switch 66, the reset signal from module 26 from reaching the safety computer (that is just being programmed).

Figure 3:
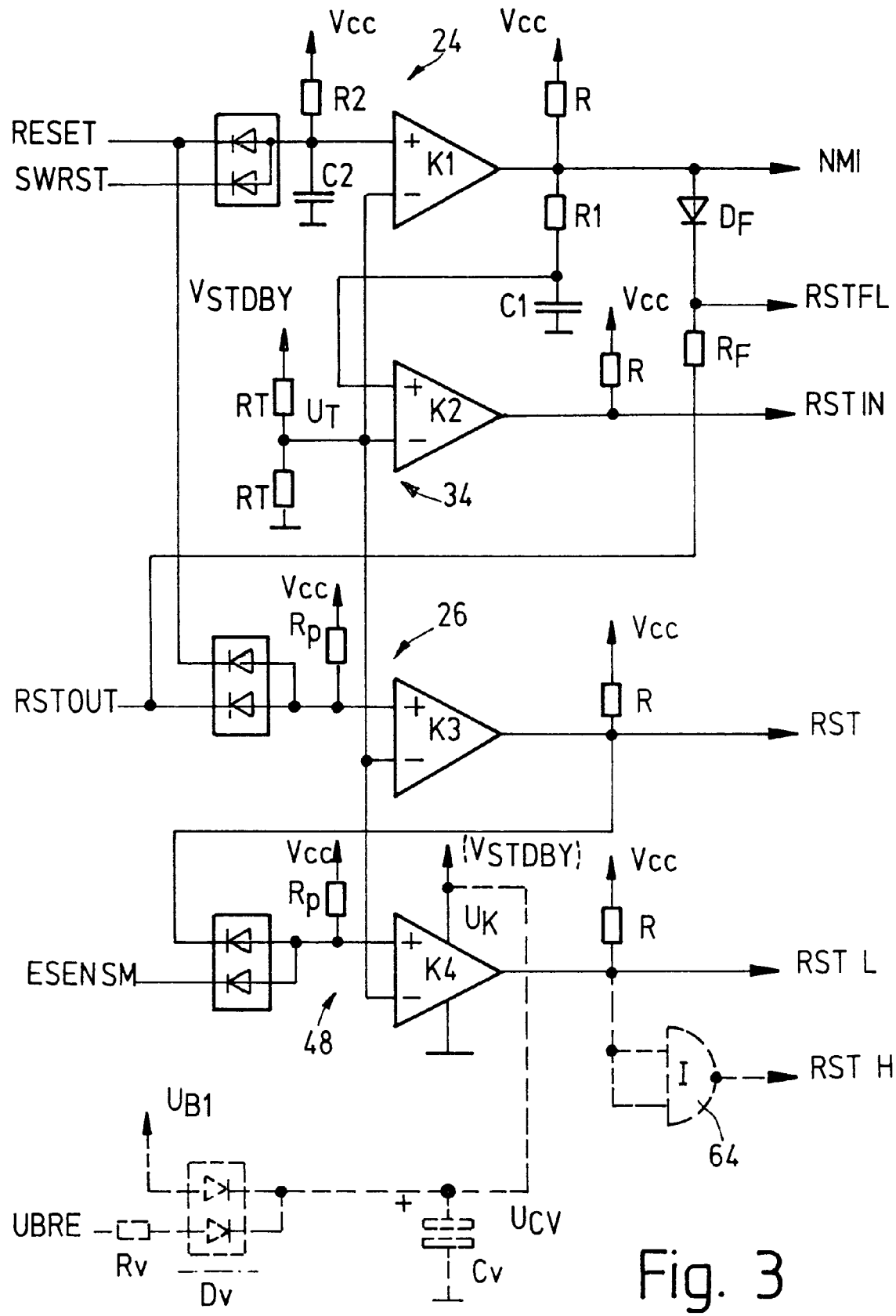
FIG. 3 depicts a variant of the circuit arrangement shown in FIG. 2.

FIG. 3 shows a variant of the design of the circuit shown in FIG. 2. It is clear here that the AND elements 24, 26 and 48 can be formed from double diodes with downstream comparators K1, K2, K3 and K4.

To keep reset spikes from occurring during switch-on (i.e., during setup of the Vcc voltage to the computing unit 12), the output circuit of the comparator K1 providing the NMI signal and the comparator K2 providing the RSTIN signal must be clear-cut. It is provided for this purpose that the negative input $U_T$ of the comparators K1, K2, K3, K4 is derived from the permanent voltage Supply $V_{STDBY}$. In this manner, a clear-cut potential is defined before the rise of the Vcc potential by the reset.

Moreover, the switch-on voltage UBRE of the reset module 20 is switched via a protective resistor $R_V$ and a diode $D_V$ to the comparator supply $U_K$. It is achieved in this manner that the comparators K1, K2, K3, K4 are operational before a rise of the Vcc potential since a delay, not shown here, of the application of the switch-on voltage UBRE up to the rise of the Vcc potential is integrated into the reset module 20.

To keep reset spikes from occurring during switch-off (i.e., during the drop of the vcc potential), the supply of comparators K1, K2, K3, K4 is buffered via an additional buffer capacitor $C_V$. This is necessary since upon switch-off of the reset module 20 after completion of the follow-up procedure, the voltage $U_{B1}$ drops faster than the voltage $V_{cc}$ and the comparators K1, K2, K3, K4 would otherwise no longer have available a supply voltage $U_K=UC_V$. The buffer capacitor $C_V$ is charged up via the diode $D_V$ from the voltage $U_{B1}$ and is connected (switched) in parallel to the comparators K1, K2, K3, K4. The buffer capacitor $C_V$ is dimensioned such that it maintains a sufficiently high supply voltage $UC_V$ on the comparators K1, K2, K3, K4 longer than the voltage drop lasts.

Moreover, it is necessary upon the drop of the Vcc supply to keep as short as possible the time from the under-voltage reset of the reset module 20 until the going-into-effect of the reset on the functional computer 14 (i.e., the application of the reset input signal RSTIN on the input 36), since for an excessively long delays the Vcc supply voltage drops to values at which the core elements of the functional computer 14 are no longer specified. It is provided for this purpose to buffer the Vcc supply voltage via a sufficiently large electrolytic capacitor and to dimension the delay time of the timing element 38 as short as possible. In this manner, there results for a typical drop-off time of Vcc of approx. 5 mV/ms, assuming an under-voltage reset threshold of the module 20 of 4.5 V, a voltage drop of maximum 60 mV (i.e., to 4.44 V, a value that lies just at the specification limit of the components ($\approx$4.5 V)).

When using CMOS comparators having a lower supply current of, for example, less than or equal to 100 $\mu$A, or for an application-related allowed standby current of the supply voltage $V_{STDBY}$ of less than or equal to 2 mA, the comparators K1, K2, K3 and K4 can be connected directly to the supply voltage $U_K=V_{STDBY}$ so that the smoothing via the protective resistor $R_V$, the diode $D_V$ and the buffer capacitor $C_V$ is not necessary (shown in dashed lines in FIG. 3).

Figure 4:
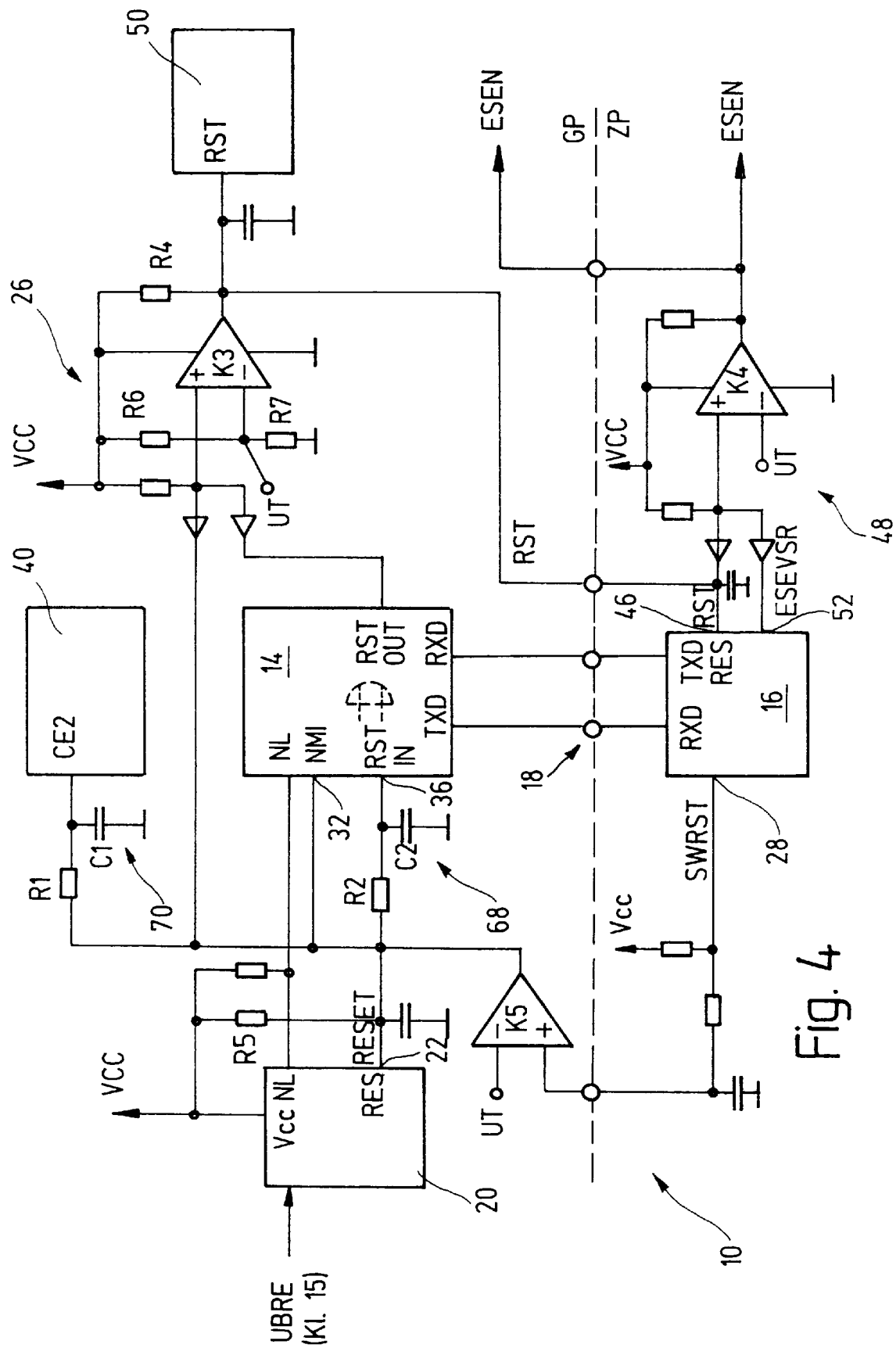
FIG. 4 depicts an overall view of a second embodiment of the circuit arrangement according to the present invention.

In FIG. 4, a second embodiment of the circuit arrangement 10 according to the present invention is shown in which parts identical to those used in FIG. 1 are again given the same reference signs and are not explained anew.

The circuit variant shown in FIG. 4 is advantageous for the case where sharp edges of the NMI signal at input 32 and of the reset input signal RSTIN at input 36 of the functional computer 14 are not needed. The comparator stages K1 and K2 shown in FIG. 3 for providing these signals are thus unnecessary. The NMI signal is formed directly from the reset signal RESET present at the output 22 of the reset module 20 and the software reset signal SWRST of the safety computer 16. The input signal RSTIN present at the reset input 36 of the functional computer 14 can be formed by a first low-pass filter 68 including the resistor R2 and the capacitor C2. The reset input signal for the RAM module 40 is formed via a second low-pass filter 70 including the resistor R1 and the capacitor C1. A further simplification of the circuit arrangement 10 includes replacing the remaining comparators K3 and K4 with simple AND gates. However, it is to be noted here that the signal RESET ($U_{SAT}$<0.4 V) present at the output 22 of the reset module 20 conforms upon switch-off of the supply voltage Vcc to this potential from Vcc <1 V since the internal transistor of the reset module 20 can no longer saturate. This can be remedied by changing, for example, the output stage of the reset module 20 by supplying, for example, the reset transistor from the supply voltage $V_{STDBY}$.

Figure 5:
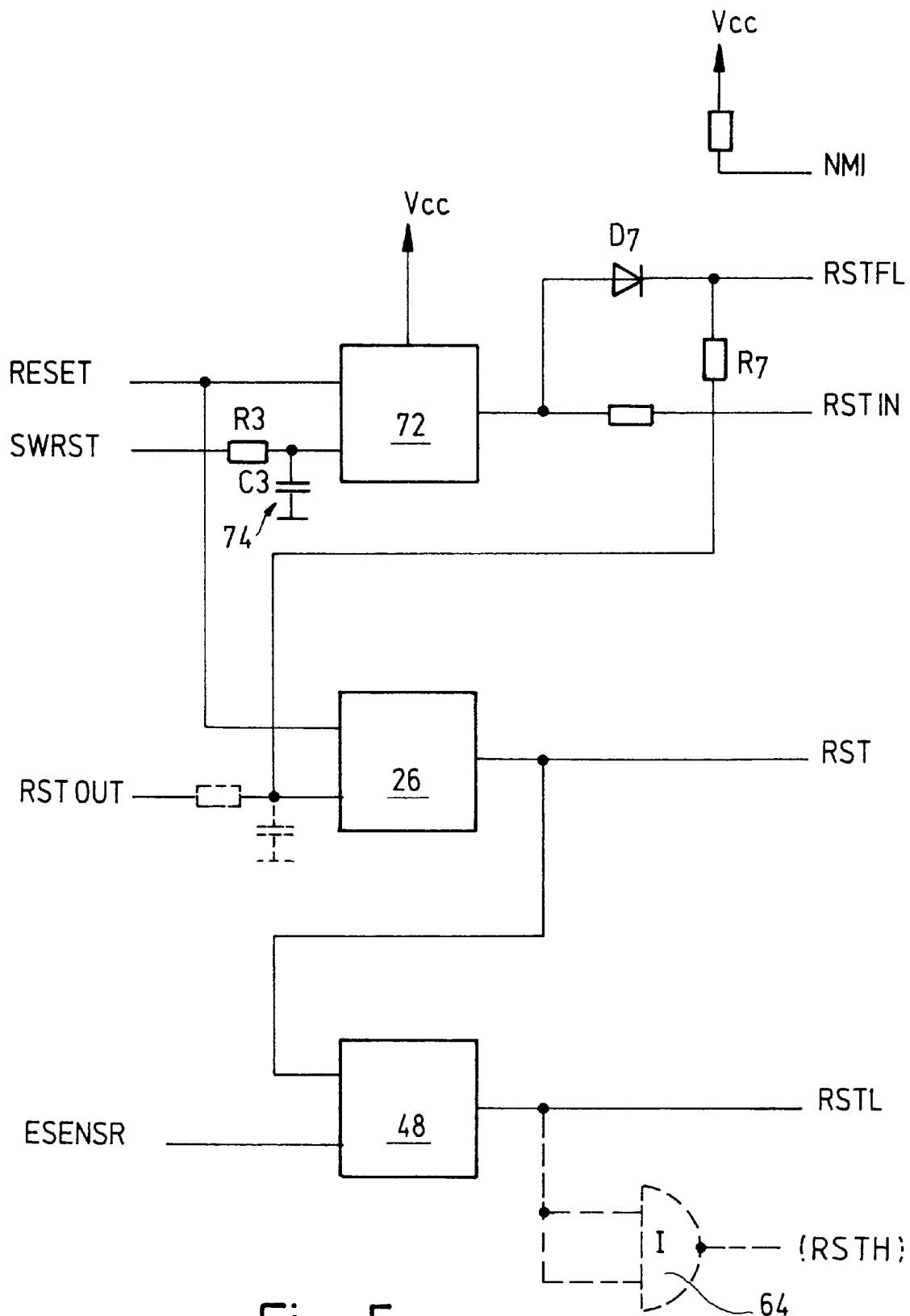
FIG. 5 depicts a third embodiment of the circuit arrangement according to the present invention.

FIG. 5 shows a third embodiment according to the present invention that can be used particularly in electronic control units without permanent supply. Parts identical to those used in the preceding figures are again given the same reference signs and are not explained anew. The circuit arrangement can be simplified in that the NMI signal is applied directly to the Vcc potential. The switching stage 24 (FIG. 1) is then made unnecessary. Here, the reset input signal RSTIN is generated by a switching stage 72 to which the output signal of the reset module 20 RESET and the software reset signal SWRST of the safety computer 16 are fed. Due to the delay already explained, the software reset signal SWRST is fed via a low-pass filter 74 of the resistor R3 and the capacitor C3.

In FIGS. 6–10, timing diagrams are shown that illustrate the timing behavior of the signals explained in the previous figures.

Figure 6:
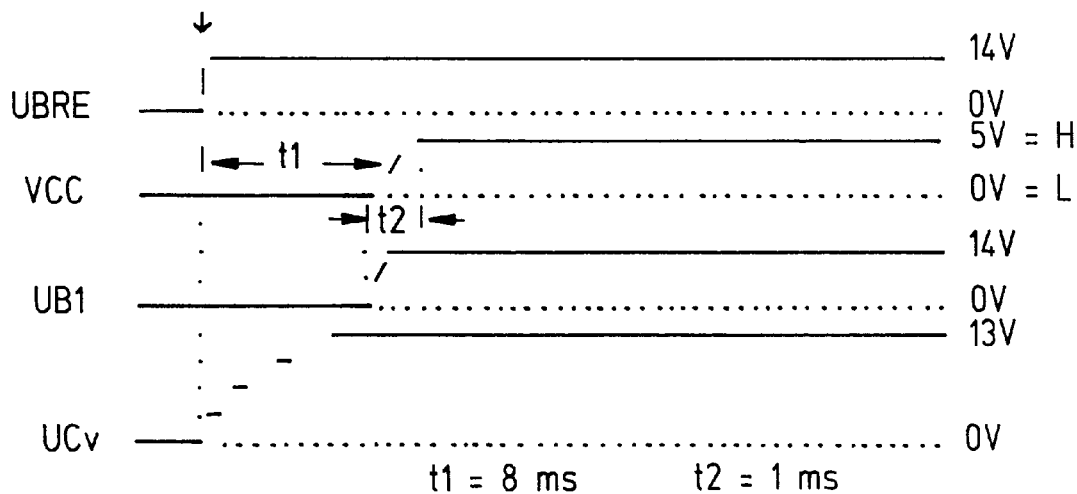
FIG. 6 depicts a first timing diagram for individual signal processes according to the present invention.
Figure 7:
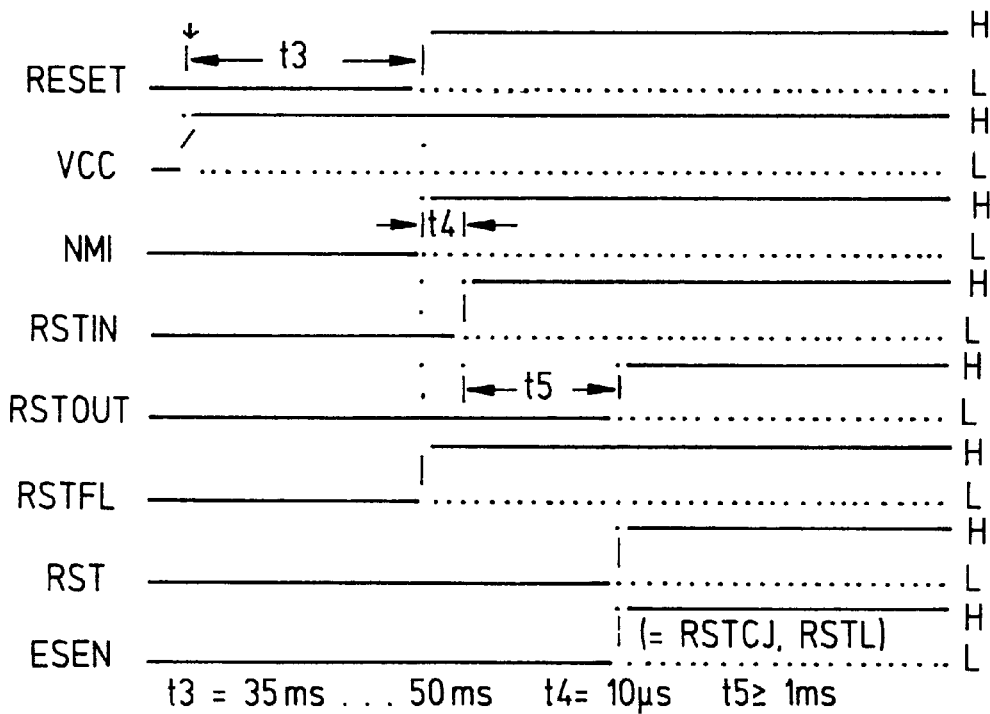
FIG. 7 depicts a second timing diagram for individual signal processes according to the present invention.

FIG. 6 shows the structure of the signals provided by the reset module 20 after the input voltage UBRE is applied to the reset module 20. The further structure of the signals after activation of the reset module 20 takes place in accordance with the timing diagrams shown in FIG. 7.

Figure 8:
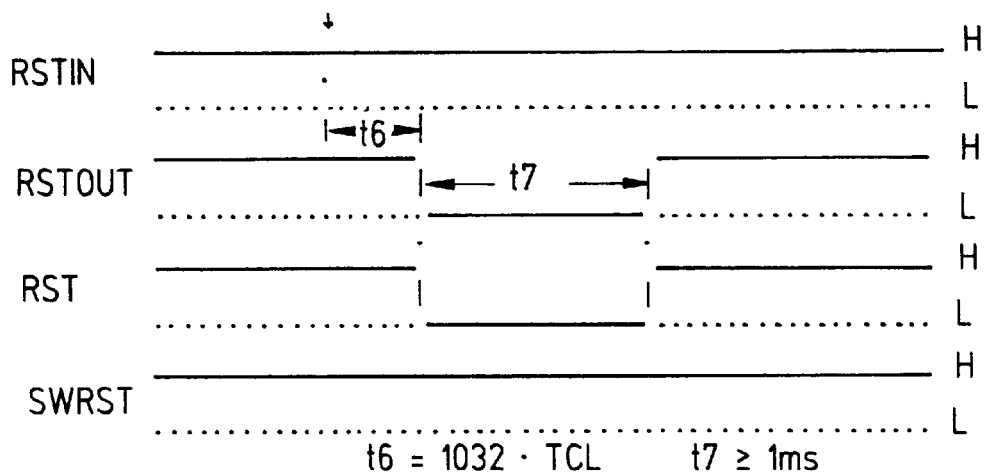
FIG. 8 depicts a third timing diagram for individual signal processes according to the present invention.
Figure 9:
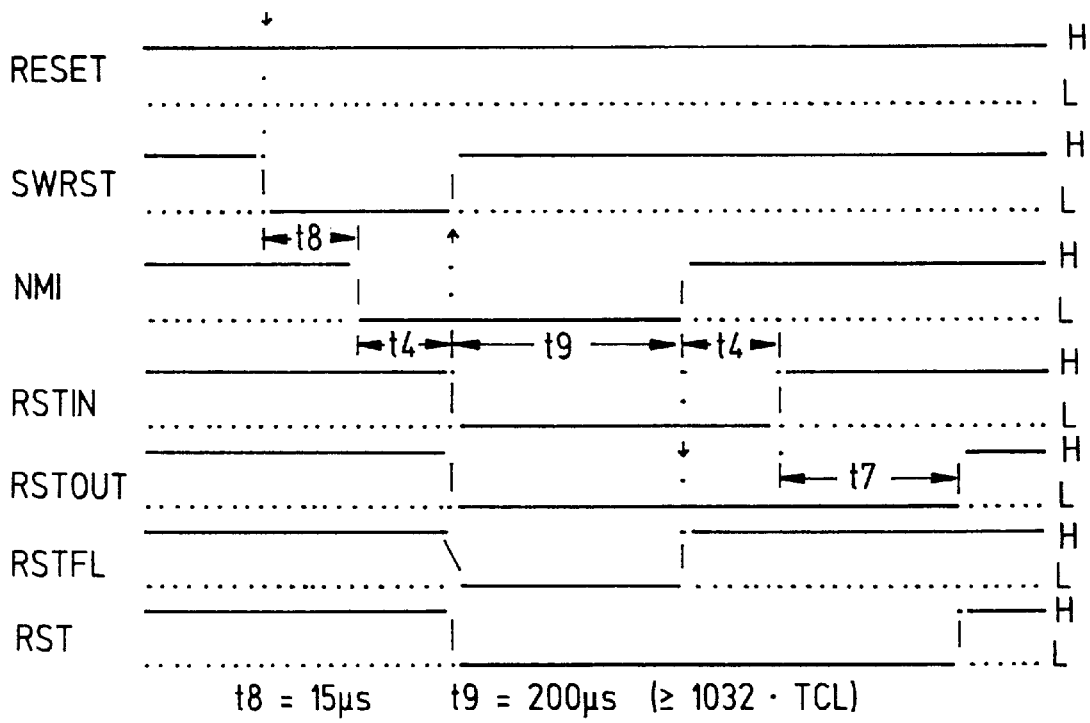
FIG. 9 depicts a fourth timing diagram for individual signal processes according to the present invention.

FIG. 8 shows the timing behavior of the signals after triggering of a software reset by the watchdog integrated into the functional computer 14, whereas FIG. 9 shows the timing behavior of the signals during a software reset triggered by the safety computer 16.

Figure 10:
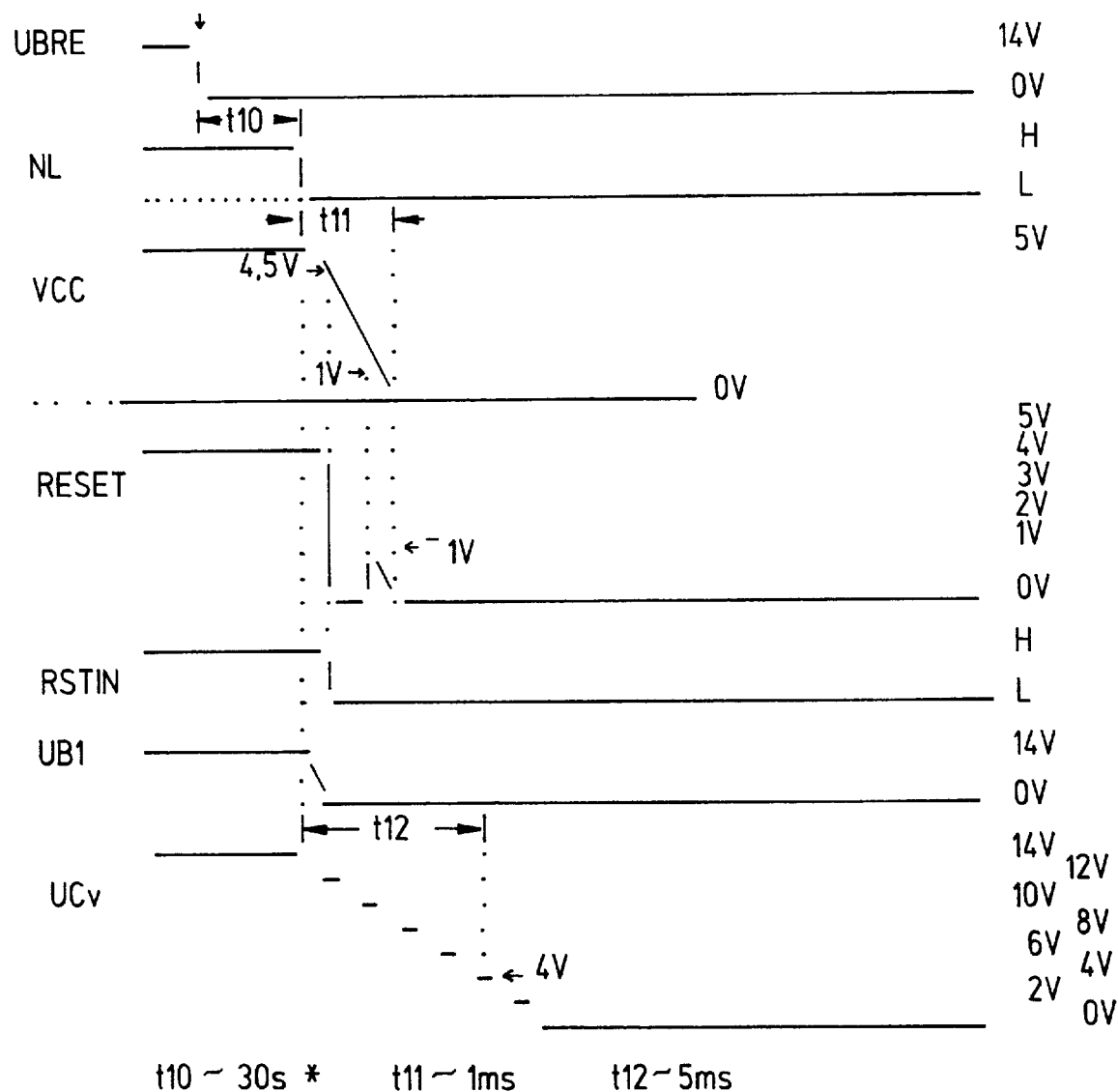
FIG. 10 depicts a fifth timing diagram for individual signal processes according to the present invention.

Finally, FIG. 10 is used to illustrate the timing of the signals when the switch-on voltage UBRE of the reset module is switched off.

What is claimed is:

1. A circuit arrangement for executing a reset of a computing unit, comprising:
   a functional computer;
   a safety module connected to the functional computer via a serial interface, the safety module operating autonomously from the functional computer;
   a reset stage coupled to the functional computer and the safety module, the reset stage being capable of coercively switching each of the functional computer and the safety module into a reset state, the functional computer continually monitoring the safety module and the safety module continually monitoring the functional computer, wherein in a fault condition, the functional computer is capable of resetting the safety module and the safety module is capable of resetting the functional computer;
   at least one output stage coupled to the functional computer and the safety module, the at least one output stage being switched off in the reset state:
   a first switching stage having an output coupled to a NMI input of the functional computer; and
   a second time-delayed switching stage connecting the output of the first switching stage to a reset input of the functional computer,
   wherein a reset output of the reset stage is coupled to an input of the first switching stage.

2. The circuit arrangement as defined in claim 1, wherein the functional computer and the safety module form the computing unit for an electronic control unit of a motor vehicle.

3. The circuit arrangement as defined in claim 1, wherein the safety module includes a computer communicating with the functional computer via a synchronous serial two-wire interface connection.

4. The circuit arrangement as defined in claim 1, wherein the safety module includes a computer communicating with the functional computer via an asynchronous serial one-wire interface connection.

5. The circuit arrangement as defined in claim 1, wherein the safety module includes an intelligent logic circuit.

6. The circuit arrangement as defined in claim 5, wherein the intelligent logic circuit includes a window watchdog.

7. A circuit arrangement for executing a reset of a computing unit, comprising:

a functional computer;

a safety module connected to the functional computer via a serial interface, the safety module operating autonomously from the functional computer;

a reset stage coupled to the functional computer and the safety module, the reset stage being capable of coercively switching each of the functional computer and the safety module into a reset state, the functional computer continually monitoring the safety module and the safety module continually monitoring the functional computer, wherein in a fault condition, the functional computer is capable of resetting the safety module and the safety module is capable of resetting the functional computer;

at least one output stage coupled to the functional computer and the safety module, the at least one output stage being switched off in the reset state;

a first switching stage coupling a reset output of the reset stage and a software reset output of the safety module, an output of the first switching stage being connected to a NMI input of the functional computer; and a second switching stage connecting the output of the first switching stage to a reset input of the functional computer.

8. The circuit arrangement as defined in claim 7, wherein the first switching stage includes a first timing element associated with the software reset output of the safety module.

9. The circuit arrangement as defined in claim 8, wherein the first timing element is designed assymetrically.

10. The circuit arrangement as defined in claim 7, wherein the second switching stage includes a non-inverting switching stage having a second timing element for delaying the reset input signal with respect to the NMI signal.

11. The circuit arrangement as defined in claim 7, further comprising:

a third switching stage coupling a reset output of the functional computer to the reset output of the reset stage, an output of the third switching stage being connected to a reset input of the safety module.

12. The circuit arrangement as defined in claim 11, further comprising:

a fourth switching stage coupling the output of the third switching stage to an output stage switch-off output of the safety module, an output of the fourth switching stage being connected to at least one of the at least one output stages.

13. The circuit arrangement as defined in claim 12, wherein each of the first, second, third and fourth switching stages are formed via AND logic elements.

14. The circuit arrangement as defined in claim 13, wherein the AND logic elements include at least one of a double-diode circuit and a comparator circuit.

15. The circuit arrangement as defined in claim 14, wherein a negative input of each comparator circuit is connected to a divider voltage, the divider voltage being formed via a permanent supply voltage .

16. The circuit arrangement as defined in claim 12, further comprising an inverting switching stage connected to the output of the fourth switching stage, the inverting switching stage providing a reset high signal.

17. The circuit arrangement as defined in claim 14, wherein a supply voltage for each comparator circuit is precharged from a switch-on voltage via a diode and a protective resistor.

18. The circuit arrangement as defined in claim 17, wherein a supply voltage for each comparator circuit is buffered via a capacitor.

19. The circuit arrangement as defined in claim 7, wherein the output of the first switching stage is connected to a reset output of the functional computer via a diode and a resistor, thereby forming a reset flash signal.

20. A circuit arrangement for executing a reset of a computing unit, comprising:

a functional computer, a safety module connected to the functional computer via a serial interface, the safety module operating autonomously from the functional computer;

a reset stage coupled to the functional computer and the safety module, the reset stage being capable of coercively switching each of the functional computer and the safety module into a reset state, the functional computer continually monitoring the safety module and the safety module continually monitoring the functional computer, wherein in a fault condition, the functional computer is capable of resetting the safety module and the safety module is capable of resetting the functional computer;

at least one output stage coupled to the functional computer and the safety module, the at least one output stage being switched off in the reset state, wherein each of the functional computer and the safety module include a switching output; and an EGAS output stage directly connected to each of the switching outputs.

* * * * *